Figure 3:
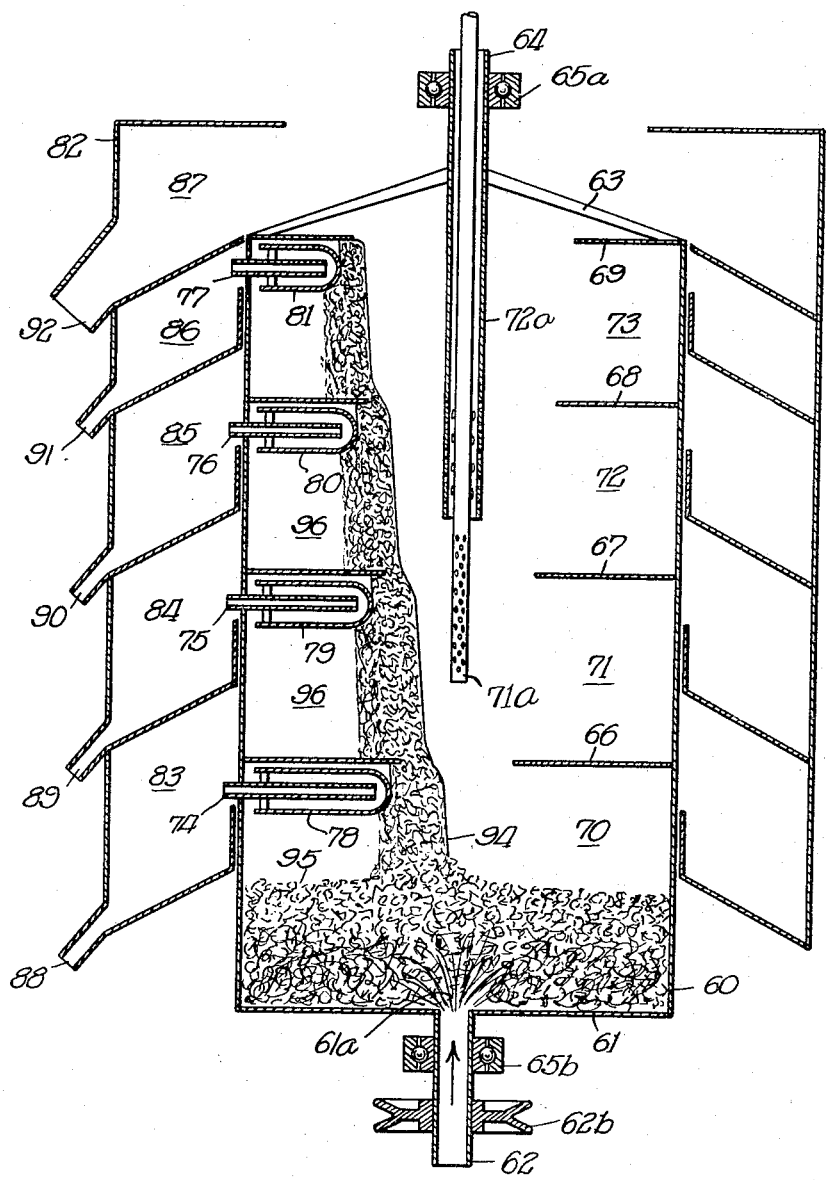

July 31, 1951  P. F. SHARP ET AL  2,562,646
MANUFACTURE OF CASEIN
Filed Sept. 4, 1947  2 Sheets-Sheet 1
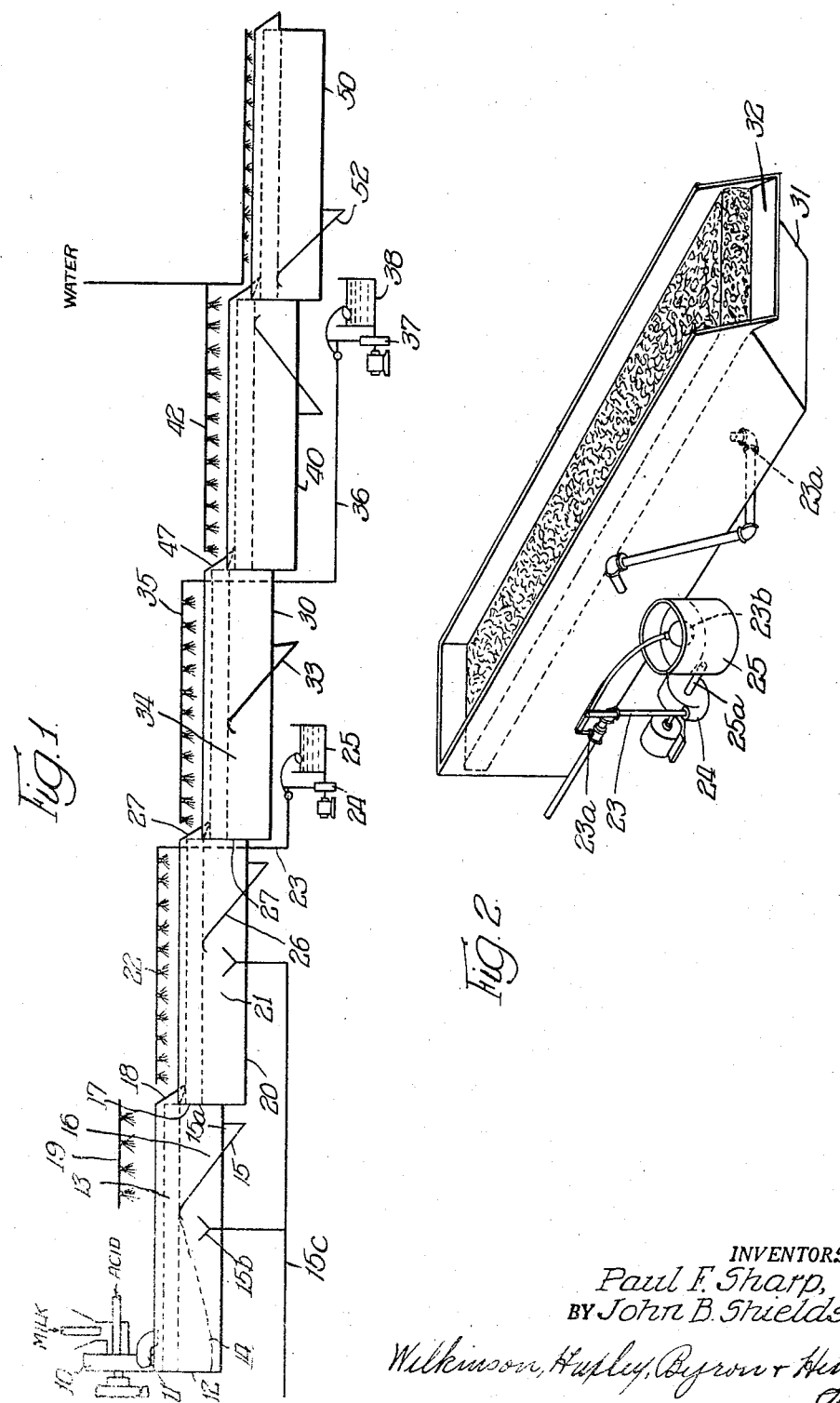
INVENTORS.
Paul F. Sharp,
BY John B. Shields,
Wilkinson, Huxley, Byron & Hume
ATTYS.

July 31, 1951  P. F. SHARP ET AL  2,562,646
MANUFACTURE OF CASEIN
Filed Sept. 4, 1947  2 Sheets-Sheet 2

INVENTORS.
Paul F. Sharp,
BY John B. Shields,
Wilkinson, Huxley, Byron + Hume
Attys.

Patented July 31, 1951

2,562,646

UNITED STATES PATENT OFFICE 2,562,646

MANUFACTURE OF CASEIN

Paul F. Sharp, Piedmont, and John B. Shields, San Francisco, Calif., assignors to Golden State Company, Ltd., San Francisco, Calif., a corporation of Delaware Application September 4, 1947, Serial No. 772,090

19 Claims. (Cl. 260—120)

This invention relates to a method of separating solid materials from associated liquids, and particularly solids which can be converted into or caused to exist as a foam or mass capable of floating on the surface of its associated liquid.

One specific application of this invention relates to the recovery of casein by separating the same from the whey and impurities after the proteinaceous material has been rendered insoluble and converted to a foam which is light enough to float on the whey.

The present invention further relates to a method of washing solids which are in the form of relatively stable foams and makes possible the freeing of such solids from adhering material so as to produce or to recover a relatively pure product therefrom.

According to one embodiment of this invention, a separation of the solids and the associated liquid is effected after the solids have been converted to a foam or a floating mass in a suitable tank or receptacle by causing the floating foam to be displaced laterally along the surface of the associated liquid and ultimately, by such lateral movement, to pass out of association with such liquid. Such treatment contemplates the simultaneous removal of liquid from the tank or receptacle by draining the same downwardly or in a direction different from that of the lateral movement of the solid mass.

In certain flotation separation methods, certain movements are given to the solids by the movement of the liquid on the surface of which the solids are sustained, whereby the liquid and the solids both move in the same general direction, with the result that the movement of the solids is dependent upon the movement of the liquid. In the above-described embodiment of the present invention, however, the movement of the solids is not effected by a corresponding movement of the liquid, as the liquid is preferably withdrawn from a point below the liquid level in the tank or receptacle in which the flotation occurs. According to this embodiment of the present invention, therefore, the floating solid material is displaced laterally across the surface of the liquid and is ultimately removed from the container or receptacle in which the flotation occurs, while the liquid is withdrawn in a different manner, in a different direction, and by different means.

While the lateral movement of the solid material on the surface of the liquid may be effected in various ways, the preferred form of the invention relies on a lateral movement of the floating solid material produced by the hydrostatic head of foam or by a crowding action exerted by the new material entering the tank or receptacle and seeking floating space on the limited surface of the liquid afforded by the area of the tank or receptacle employed. Such crowding action, when exerted on the foam already present on the surface of the liquid, ultimately results in the material being pushed to the edge of the tank over which the curd breaks in the desired manner, whereby it is separated and collected for use or further processing as may be desired in any particular case.

Such crowding action can be accomplished by the mere introduction into a suitable tank or receptacle of the liquid and solids to be separated after the solids have been processed in a manner to render them floatable on the liquid.

If the solids and liquid are continuously introduced into the receptacle or tank, the liquid may be continuously withdrawn from a point below the liquid level therein, and the solids will be continuously moved and displaced laterally over the edge thereof, with the result that the process is carried out automatically and continuously, with the separation of the solids and liquid occurring at the same rate that the constituent parts thereof are introduced into the tank.

When treating various substances such as relatively stable foams, as, for instance, cheese curd, casein, and the like, washing operations of a more or less extensive degree are preferably conducted and can be carried out by spraying washing liquid, such as water, onto the foam when the foam is in either the original separation tank or receptacle or in a different tank or receptacle to which the material may be passed for washing after the initial separation treatment.

In one form of the invention, a series of flotation tanks may be arranged in stepped relation but in such disposition that the first tank is the highest and each subsequent tank thereafter progressively is lower and each tank in the series is positioned to receive solids displaced from the next preceding tank. In such a system, the initial separation, with or without washing, may be carried out in the first tank, and thereafter further separation by washing can be accomplished in one or more subsequent tanks. The washing may be accomplished by using water or other cleaning liquid applied in each tank, respectively, preferably in the form of a spray. Such washing can be conducted to the extent required and for as many tanks or by as many separate operations as may be necessary in any particular case. However, when casein is being produced according to this process, the washing water can be used repeatedly over and over again to great advantage, for the reason that by such repeated uses of the washing water employed only approximately one-twelfth of the quantity of wash water normally required is needed and the concentration of solids therein that are recovered from the floatable material being washed can be increased to a point where the wash water approaches the solids content of the original whey separated from the casein. The production of such concentration permits the wash water to be mingled and handled with the whey, as for all practical purposes it is substantially the same thing. Thus the whey and wash water can be dried and handled together, which, of course, avoids the necessity of throwing away the wash water and the contained solids, such as otherwise would be necessary if the concentration of solids in the wash water were not increased to a point of producing an economical and usable material. This last advantage avoids the costly sewage disposal problem which is involved where the wash water cannot be processed in this manner.

Such repeated washing operations can be conducted by first applying fresh washing water to the last tank in the series and in using the wash water as the liquid on which the solid foam floats. By spraying the water onto the floating mass of solids, such washing operation is conducted while the floating mass passes laterally on the surface of the water held in the tank or receptacle, by the crowding action above referred to. At the same time, the washing water is removed in a different direction, namely, by withdrawing the same from a point below the liquid level in the tank at a rate which will maintain a constant level in the tank. Thereafter, the withdrawn wash water is used as the washing water for the next preceding tank wherein it is likewise sprayed on the moving floating mass which is there undergoing similar treatment. By taking the wash water from such tank and using it as wash water in the next preceding tank and carrying this washing operation on to a required extent a concentration of solids in the wash water is produced which approaches that of the whey and at the same time an extremely clean and desirable finished product results.

As the solid foam moves down from one tank to the other, it is presented to wash water of progressively lower solids concentration or, in other words, to water of progressively cleaner character. At the same time, the wash water is being conveyed in the direction opposite to the passage of the solid product, whereby it is exposed to a product the quantity of impurities in which is progressively increased. Accordingly, the concentration of solids in the wash water is constantly built up as it passes from one tank to the next and the product becomes cleaner and cleaner.

According to the conventional method of producing high quality casein, the protein is precipitated from skim milk with either rennet, acid, or other precipitating agent. When so precipitated, the curd always contains extraneous matter such as salts, lactose, and some occluded but unprecipitated proteins such as globulin and lactalbumin. Due to the fact that the curd is heavier than the whey it tends to settle toward the bottom of the treating tank in the form of a large number of small particles which become loosely matted together as a bulky mass. This mass generally settles only to the extent of having a minor portion of the liquid in a settling tank as decantable, clear liquid containing no solid material. In such a process, the whey is then removed by decantation. However, curd must be washed repeatedly by resuspension to remove impurities, which is an operation requiring large volumes of water in addition to being time consuming. Furthermore, such treatment requires the installation of large, expensive, and space-consuming equipment, such as large tanks provided with agitators and drain racks, all of which are difficult to maintain and clean. Such old and known process for producing casein also necessitates manual handling of the curd, which is undesirable. In applicants' copending application, Serial No. 612,965, filed Aug. 27, 1945, now abandoned, there is disclosed a method for recovering casein from milk. In that process, milk, acid, and air are mixed simultaneously and the mixture is caused to issue from the mixing device as a froth which is fed to and collected in a receptacle or tank. In the tank the froth quickly separates into a whey layer and a solid layer made up of a proteinaceous foam which floats on the surface of the whey. This foam layer is then preferably collected by a paddle device which propels the foam along the surface of the whey to a removal point. Next, the foam either is pushed onto an inclined moving belt or a screen, or is trapped between moving paddles traveling up an inclined surface and thus removed from contact with the whey. The whey is drained from the receptacle and the curd, after separation, is washed by water which is preferably sprayed into the foamy mass, collected in the above-described manner, and held on a screen or the like. Certain mechanical complications involved in the washing of casein foam when the same is carried on a screen or the like markedly reduce the efficiency of that process which otherwise is commercially satisfactory.

Casein produced by the method described above and claimed in said copending application, is of low density, or in other words, it has a large volume per unit weight. Consequently, when such foam is deposited in a tank, a large surface area must be provided so that the foam will spread in a layer thin enough to permit proper drainage and thorough washing. The result is that large or multiple paddle conveying devices must be employed. The cost of operating such oversize equipment constitutes a portion of the total operating cost, which is unduly large.

The present invention overcomes many of the objectionable features of the prior art and permits the continuous production of an edible protein of the highest quality without requiring manual manipulation of curd and without requiring the use of expensive or cumbersome machinery for collecting and washing the foam-like curd.

It is, therefore, an object of the present invention to provide a method of separating coagulated proteins in the form of foam or froth, whether precipitated with acid, rennet, or other precipitating agent, from its associated liquid in a way which eliminates mechanical conveying equipment.

It is a further object of the present invention to provide a method for effectively conducting a countercurrent washing of floating casein in the form of a foam-like mass.

A still further object is to provide a process which can be conducted with the use of simple equipment, which is easy to clean, and which improves the sanitation of the operation.

Another object is to provide a method according to which the washing medium permeates the casein material and comes in contact with individual particles of the mass and washes away occluded foreign material.

Another object is to provide a method whereby foam-like casein is rapidly separated from substantially all liquid with which it is associated during processing and is readily received at a porous but relatively high solids content material.

These and other objects not specifically mentioned will appear to those skilled in this art as the following description proceeds.

In the drawing—

Figure I is a diagrammatic illustration of one embodiment of the invention.

Figure II is a perspective view of an individual tank.

Figure III is a cross sectional view of a unit consisting of a single vessel divided into four zones, which is adapted for rotation.

Briefly, the invention is predicated upon the discovery that certain materials when given a foam-like structure can be separated from their associated liquid by a crowding action exerted by the material itself, whereby to cause the material and liquid to take divergent paths of travel, and that such materials can be thoroughly washed while they float on a liquid medium without causing the foam to disintegrate or to lose its buoyancy. Thus, a flow path may be established consisting of one or more vessels or one or more zones within a single vessel. In such a flow path the vessels or zones are positioned so that floating material is discharged over the wall of one vessel or zone and travels automatically into the next vessel or zone of the series, and thereafter is withdrawn from the flow path as a spongy, semi-dry mass.

The process comprises, by way of a simple specific example, the steps according to which a lacteal fluid containing protein material may be mixed with a coagulating agent under conditions to produce an aerated mixture, that is to say, a gaseous-liquid-solids dispersion. The mixture so produced is then discharged into the first vessel of a series of vessels and preferably adjacent one end thereof. A liquid level is established and maintained in the vessel substantially at the height of the lowest wall of the vessel. The aerated mixture, having a density greater than that of partially drained foam due to the presence of liquid incorporated in the foam by the mixing, is introduced continuously into the vessel where it exerts a pressure or crowding action which displaces the lighter partially drained foam radially outwardly and toward the discharge portion of the vessel. This action forces the accumulated foam, which is separated from the whey and is floating on the top thereof, to discharge over the selected wall of the vessel and cascade downwardly into the next vessel positioned at a slightly lower level.

Figure I of the accompanying drawing diagrammatically represents one procedure and equipment which can be used for practicing the invention.

According to the practice illustrated, skim milk and a suitable acid from sources not shown are fed to the open eye of a centrifugal pump 10. The feed inlets are so arranged that milk and acid only meet as they enter the mixing chamber and the inlets permit the pump to suck air. The milk, acid, and air are mixed substantially instantaneously in such a manner that the coagulated protein particles have air cells entrapped therein or attached thereto. The frothy mixture produced by the mixing is discharged through pipe 11 into tank 12. Here, the casein foam 13, which is a gaseous-liquid-solids dispersion, separates from the whey 14 with which it is associated. The whey is discharged from the tank through the pipe 15 which maintains the desired liquid level in the tank 12. The casein foam 13 moves to the discharge end 16 of the tank 12 and is displaced so that it falls over the end wall 17 and slides down an apron 18 and into a second tank 20. Washing may or may not have been started by spraying water from the nozzles 19 as the casein foam 13 approaches the discharge end 17 of tank 12. If washing has been started, it obviously can be controlled so that no wash water can seep entirely through the foam layer before the casein foam is displaced from the tank. Under such condition, washing may be started early without diluting the separated whey.

Tank 12 is representative of each tank in the series, differing only in that in most cases it will be the largest of the group. Tank 12 is a rectangular, open tank having three sides of equal height and having its fourth wall 17 of lesser height than the other sides. An apron 18 is shown positioned in contact with the top of wall 17 to prevent the material from running down the outside of the wall 17. Pipe 15 connects with the liquid discharge opening 15a in the bottom of tank 12. Pipe 15 is shown curved upward until it reaches approximately the height of wall 17. The pipe discharges into a receiver 15b which in turn connects to pipe 15c. The pipe 15 thus gives one form of automatic liquid level control.

The casein foam 13 received in tank 20 floats on the liquid 21. The liquid 21 is comprised of the washing liquid plus the solids washed from the casein. The washing liquid is supplied through spray nozzles 22 which apply the liquid in a fine, misty spray to the top of casein foam 13. This sprayed liquid seeps through the foam layer 13, washing the same, and collects in the bottom of the tank 20. In the particular form of apparatus diagrammatically represented in Figure I, which illustrates a countercurrent washing treatment, the washing medium is supplied to the spray nozzles 22 through pipe 23. The liquid is forced to the spray nozzles by pump 24 which obtains the liquid from the succeeding tank 30 through pipe 33 and float tank 25.

The salt and lactose enriched washing medium 21 which is accumulated in tank 20 is withdrawn through pipe 26. Pipe 26 like its counterpart, namely, pipe 15, is positioned and segmented to maintain a predetermined liquid level which in this case is substantially the level of the end wall 27 of the tank 20.

As above pointed out, the casein layer created in tanks 20, 30, and 40 is displaced or crowded outwardly by the hydrostatic head of foam accumulated at the points where the foam falls into each tank. The casein layer thus progressively moves laterally on the surface of the liquid longitudinally of the tanks. In each tank it passes successively under the spray nozzles and is continuously washed, after which it is entirely displaced from the tank and falls into the next tank.

For example, the foam would be displaced from tank 20 and be caused to fall into tank 30.

In tank 30, the casein foam 13 floats on the surface of the washing liquid 34. The foam is further washed with a washing liquid, but in this case the liquid has a lower concentration of salts and lactose dissolved therein than is found in the liquid supplied to tank 20 through nozzles 22. This washing liquid is preferably supplied to spray nozzles 35 through a pipe 36 by a pump 37. The pump 37 receives the liquid from the succeeding tanks 40 and 50 through pipes 42 and 52 which feed float tank 38.

The level control and pumping system is best described by reference to the illustration in Figure 2 with reference to tank 30. Tank 30 is a rectangular, open tank having three sides of equal height and having its fourth wall 31 of lesser height than the other sides. An apron 32 is shown positioned in contact with top of wall 31 to prevent the floating material breaking over the wall from running down the outside of wall 31. Pipe 33 connects with the liquid discharge opening 33a in the bottom of said tank 30. Pipe 33 is shown curved upward until it reaches approximately the height of wall 31. The pipe 33 discharges into a receiver 25. This receiver 25 is connected to pump 24 through pipe 25a. The pump 24 discharges through pipe 23. The liquid flow in pipe 23 is controlled by a valve 23a actuated by a level control float 23b in the receiver 25.

The casein foam 13 again drops downwardly and at this point falls into tank 40 where it floats on the surface of the accumulated wash water 41. The foam is washed with water supplied through the nozzles 42.

The casein foam 13 displaced from tank 40 is accumulated in tank 50 for further drainage of wash water or for further processing such as pressing and drying. When tank 50 is utilized as a drainage tank, the only water introduced into the tank 50, other than that carried in the foam, is that lubricator drip water which trickles down the side walls of the vessel. The accumulated quantity of trickle and drainage water is so small that it is here shown flowing through pipe 52 into receiver 38 whose main supply of liquid is from tank 40, although it can be disposed of by any desirable method such as shunting it to a sewer drain.

The wash water supplied to the system is shown as being tap water. Where, for such reasons as alkalinity or the like, the available water is unsatisfactory, the wash water may be purified as by ion exchange methods or the pH adjusted by addition of a small amount of dilute acid or treated in any other suitable manner.

The position and angle of spray issuing from nozzles 22, 35, and 42 can be utilized to expedite the movement of foam as well as thoroughly to wash the material by uniformly distributing the liquid. If the direction of the spray is such that a portion of the liquid strikes the sides of the vessels at a point above the casein foam, this liquid runs down the sides of the vessel and acts as a lubricant. The foam thus exhibits little or no tendency to stick to the walls. With wall friction markedly reduced, the foam moves smoothly and uniformly throughout each vessel.

In Figure 3 there is illustrated a modified form of the invention which comprises a cylindrical vessel divided into zones including a liquid-foam separation zone and washing zones. In this type of device the washing operation may be markedly speeded up and a final product obtained which has, roughly, double the solids content of the product delivered by the flow path system of Figure 1.

Referring to Figure 3, this casein-foam washer comprises a cylindrical rotating tank 60 which peferably has its longest dimension disposed axially and vertically. The tank 60 may be formed with an integral bottom section 61 provided with an axially positioned flow opening 61a. Section 61 is provided with a hollow shaft 62 which forms the flow inlet which communicates with the inside of the tank 60 through the flow opening 61a. The upper section of the cylindrical tank 60 is open. The upper circumferential part of tank 60 is connected by means such as the rigid spider 63 to a hollow hub section 64 which is axially aligned with shaft 62. Hub section 64 and shaft 62 are seated in suitable bearings 65a and 65b. The assembly is rotated by a prime mover, through suitable transmission means (not shown) such as a coupling, multispeed transmission gears, belt, or similar device which may be connected to shaft 62, as represented at 62b.

Mounted inside of the tank 60 are four circular rings or partitions 66, 67, 68, and 69, which are fixed to the wall of the cylindrical tank 60 by suitable means such as welding. The inner diameters of the rings may be progressively larger, although this is not necessary. In such event, however, the further the ring is removed from the bottom of the tank 60 the larger it is in internal diameter. In the case illustrated, the inner diameter of the ring 69 is almost double that of the ring 66. These partitions divide the rotating member 60 into sections 70, 71, 72, and 73.

Each section of the tank has its own level controller drainage pipe marked 74, 75, 76, and 77, respectively. Attached firmly to each drain pipe by pins or spiders, so as to prevent vibration, are the caps 78, 79, 80 and 81, respectively. These caps are so positioned that they prevent foam from entering the drain but do not prevent the flow of liquid.

Surrounding the cylinder 60 is a housing 82 divided into the five sections 83, 84, 85, 86, and 87. These sections have individual outlets 88, 89, 90, 91, and 92, respectively.

Extending down through the hub section 64 and through cylinder sections 71, 72, and 73 are perforated cylindrical pipes 71a and 72a, the perforations of pipe 71a communicating with section 71 and the perforations of pipe 72a communicating with section 72.

From the foregoing description it will be seen that the cylinder may be rotated at high speed and a liquid-gaseous dispersion may be introduced into the cylinder from the bottom through the shaft 62. When the cylindrical tank spins at a speed such as from 500 to 1500 R. P. M., the liquid-gaseous dispersion separates into a foam layer 94 and a whey layer 95 in section 70. Due to centrifugal force, the foam is at the core of the cylinder whereas the liquid is on the outside thereof against the cylindrical wall. Liquid 96 sprayed into sections 71 and 72 from water pipes 71a and 72a collects until the level control drains establish the desired liquid level. As the operation continues, the separated foam 94 rises through the center of the cylinder and floats on the liquids held to the cylinder walls by centrifugal force. As the foam passes through sections 71 and 72, it is contacted by streams of wash water issuing through the perforations in the center pipes 71a and 72a. The wash water thus permeates the foam layer quickly, due to the centrifugal force. Whey in section 70, wash water in sections 71 and 72, and drain water in section 73 flow out between their respective caps and drain pipes and spill out through the pipes 74, 75, 76 and 77 into the housing sections 83, 84, 85 and 86, respectively, where they collect and are individually treated as desired.

The following example may be taken as illustrative. Approximately 50,000 pounds per hour of whole milk is first put through foamless separators. This quantity of milk is approximately equal to the capacity of about 5 separators. Five thousand pounds per hour of 40% cream is thus removed, leaving approximately 45,000 pounds of skim milk per hour. This quantity of skim milk and approximately 400 pounds per hour of dilute hydrochloric acid, prepared by diluting one pound of concentrated acid to twelve pounds of solution, are each divided into duplicate streams. One stream of each material is supplied to a 2-inch centrifugal pump arranged to maintain the conditions hereinabove defined. Two of these pumps are capable of handling material at the rate of 45,000 pounds of skim milk per hour. A frothy mixture discharges from the pumps which feed into the first of a series of five tanks. To handle milk at the above rate, the first tank should be approximately 3 feet in width, 3 feet in depth and 16 feet in length. The froth discharged into this tank first separates into a whey layer and a foam layer of aerated coagulated casein curd which has a volume of approximately 73 cubic feet per hour. The foam layer will be about 18 inches thick at the outlet end of the first tank. In tanks 2 and 3 the foam moves countercurrent to the wash water. In tank 4 the casein foam is washed with a spray of fresh water.

Washing medium removed from tank 2 has a concentration of approximately 3.5 by weight of solids which is processed to recover the solids.

Casein foam displaced from tank 4 usually falls into a fifth tank where it floats on the water present therein. This tank serves to allow the wash water to drain from the foam. At the outlet end of the fifth tank, the depth of casein foam is approximately 10 inches. The foam displaced from tank 5 is a clean white material of bland flavor. This entire casein precipitation and washing operation requires only the partial attention of one operator.

While various specific embodiments of the invention have been described, it is to be understood that the invention is not limited thereto but may be varied within the scope of the appended claims.

What is claimed is:

1. The method of recovering a solid, capable of being converted into a floatable foam, from its associated liquid, which comprises converting said solid into a floatable foam, continuously collecting said foam and associated liquid to form a pool thereof under conditions effecting a segregation of liquid and foam on the basis of a response to the difference in densities of said liquid and foam, continuously withdrawing liquid from said pool at one point while permitting newly introduced foam to exert a crowding and displacing action upon other foam already present in said pool and thereby effecting a displacement of said foam with respect to said liquid toward a second point, and permitting said crowding action to discharge said foam separate from said liquid and continuously collecting the foam so discharged.

2. The method of separating a solid, capable of being converted into a floatable foam, from its associated liquid, which comprises converting said solid into a floatable foam, continuously collecting said foam and associated liquid to form a pool thereof under conditions permitting floating of said foam and a consequent segregation of the liquid and foam, continuously withdrawing in one direction liquid from said pool at a point below the surface thereof while permitting newly introduced foam to exert a crowding and displacing action upon other foam already present on the surface of said pool and thereby permitting said crowding action to displace said foam on the surface in another direction until said displaced foam is separated from said liquid, and continuously collecting the foam so displaced.

3. The process of claim 2, further characterized in that the foam on said pool is sprayed with washing liquid during said displacement thereof.

4. The process of claim 2, further characterized in that said displaced foam is collected in a second pool comprising washing liquid, and said foam is continuously introduced in said second pool, is washed by sprays of wash water projected from above, and a similar displacement and separation of foam and withdrawal of liquid is caused to occur.

5. The process defined in claim 4, further characterized in that a plurality of washing operations are conducted in a plurality of pools of washing liquid, each successive pool being maintained at a level slightly below the other whereby said foam, when displaced laterally from one pool, is displaced by gravity onto the next pool.

6. The process of claim 5, further characterized in that the washing liquid used in said washing operations is reused by passing the same from one pool in the series of pools to the next preceding pool and so on to provide a flow path for the washing liquid which is countercurrent to the path of said foam, and continuing such countercurrent re-using of said washing liquid to an extent sufficient to produce a concentration of solids therein of a predetermined value.

7. The method of separating solids from associated liquid, which comprises first converting the solids into a relatively stable foam having a density less than that of the liquid with which it is associated, introducing the same into the receiving end of a flow path and permitting the same to separate into a liquid phase and a floating foam phase, and displacing said floating foam phase laterally over the surface of the associated liquid and discharging said foam phase separate from said liquid phase while withdrawing liquid from a point below the level of said liquid.

8. The method of separating solids from associated liquid, which comprises first converting the solids into a relatively stable foam having a density less than that of the liquid with which it is associated whereby separation into a liquid phase and a foam phase occurs, introducing the same into the receiving end of a flow path, displacing said floating foam phase laterally over the surface of the associated liquid and thereby separating said foam phase from said liquid phase while withdrawing liquid from a point below the level of said liquid, and spraying the separated foam with washing liquid as said foam is forced across the liquid surface of the flow path by the pressure exerted by freshly introduced dispersion, and collecting the discharged foam.

9. The method of recovering a relatively stable foam having a density less than that of the liquid with which it is associated, which comprises introducing and rotating a gaseous liquid dispersion at high speed in a series of centrifuging zones, establishing a controlled depth of liquid in said zones, forcing the floating foam through the zones by the pressure of freshly introduced foam, and collecting the washed foam discharged from said centrifuging zones.

10. The method of washing a relatively stable foam having a density less than that of the medium with which it is associated, which comprises continuously introducing a dispersion which separates into a liquid phase and a floating foam phase into the receiving end of a flow path, spraying the separated foam with washing medium as said foam is forced across the liquid surface of the flow path by the pressure exerted by freshly introduced dispersion, and collecting the discharged foam.

11. The method of washing a relatively stable foam having a density less than that of the medium with which it is associated, which comprises continuously introducing a dispersion which separates into a liquid phase and a floating foam phase into the receiving end of a flow path in which the dispersion is subjected to centrifugal force, spraying the foam which floats on a predetermined depth of liquid held adjacent the flow path periphery as said foam is forced across the liquid surface by the pressure of freshly introduced dispersion, and continuously removing separately the foam and separated liquid.

12. The method of washing a relatively stable foam having a density less than that of the medium with which it is associated, which comprises continuously introducing a dispersion which separates into a liquid phase and a floating foam phase into the receiving end of the first of a group of sequentially arranged zones, said zones being positioned in such manner that the foam displaced from one zone drops to and floats on the liquid in the next zone, continuously forcing the foam across the liquid surface and out of each zone by the pressure of freshly introduced dispersion, continuously spraying the foam with washing medium while said foam traverses each zone, and continuously collecting the washed foam discharged from the last zone.

13. The method of washing a relatively stable foam having a density less than that of the medium with which it is associated, which comprises continuously introducing a foam and associated liquid medium into the receiving end of the first of a group of sequentially arranged zones and separating therein the foam and associated liquid medium into a liquid phase and a foam phase, said zones being positioned in such manner that the foam displaced from one zone floats on the liquid in the next zone, continuously forcing the foam across the liquid surface and out of each zone by the pressure of freshly introduced foam, spraying the foam with washing medium while said foam traverses the zones intermediate the first and last zones, and continuously collecting the washed and substantially drained foam discharged from the last zone.

14. The method of washing a relatively stable foam having a density less than that of the medium with which it is associated, which comprises continuously introducing a foam and associated liquid medium into the receiving end of the first of a group of sequentially arranged zones and separating therein the foam and associated liquid medium into a liquid phase and a foam phase, said zones being positioned in such a manner that the foam displaced from one zone floats on the liquid in the next zone, continuously forcing the foam across the liquid surface and out of each zone by the pressure of freshly introduced foam, spraying the foam as it traverses each zone with the drained wash water from the next zone into which the foam travels, and continuously collecting the washed and substantially drained foam discharged from the last zone.

15. The method of washing aerated coagulated protein material having a density less than water, which comprises continuously introducing a gaseous-liquid dispersion of protein material which separates into a liquid and a foam phase into the receiving end of the first group of sequentially arranged zones, said zones being positioned in such manner that the foam phase displaced from one zone floats on the liquid surface and out of each zone by the pressure of freshly introduced material, continuously spraying the foam with washing medium while said foam traverses each zone, and continuously collecting the washed foam discharged from the last zone.

16. The method of washing coagulated aerated protein material having a density less than water, which comprises continuously introducing a gaseous-liquid dispersion of protein material which separates into a liquid and a floating curd into the receiving end of the first of a succession of descending zones, continuously forcing the floating curd to the discharge point of each zone and continuously displacing said curd therefrom by the pressure of freshly introduced curd, continuously moving the floating curd through and out of each zone in turn while continuously spraying the floating curd with washing medium, and continuously discharging the floating curd to final drainage and collection.

17. The method of washing an aerated casein foam coagulated from milk, which comprises continuously introducing a gaseous-liquid dispersion which separates into a whey liquid and a floating casein curd into the receiving end of the first of a group of sequentially and cooperatively arranged zones, said zones being positioned in such manner that the casein curd displaced from one zone floats on the liquid in the next zone, continuously forcing the floating curd across the liquid surface and out of each zone by the pressure of freshly introduced floating curd, continuously spraying the foam traversing the zones intermediate the first and last zones with the drained wash water accumulated in the succeeding zone in the sequence, and continuously collecting the washed and substantially drained casein curd discharged from the last zone.

18. The method of washing a relatively stable foam having a density less than water, which comprises continuously introducing and rotating a gaseous-liquid dispersion of protein material at high speed in a series of centrifuging zones, separating the liquid and foam by centrifugal force, continuously forcing the foam through the zones by the pressure of freshly introduced foam, continuously spraying the foam with washing medium while said foam traverses each zone intermediate the first and last zone, continuously removing liquid and wash water from the rotating zones, and continuously collecting the washed foam discharged from the last zone.

19. The method of washing a relatively stable foam having a density less than that of the liquid with which it is associated, which comprises introducing and rotating a gaseous-liquid dispersion in a succession of high-speed rotating zones to effect phase separation between foam and liquid, controlling the level of liquid in said zones by the controlled drainage of the liquid therein, forcing the floating foam through successive zones by the pressure of freshly introduced foam, spraying the foam with washing medium while the foam traverses said zones, and collecting the washed foam discharged from the last rotating zone.

PAUL F. SHARP.
JOHN B. SHIELDS.

REFERENCES CITED

The following references are of record in the file of this patent:

UNITED STATES PATENTS

| Number | Name | Date |
|---|---|---|
| 793,808 | Sulman et al. | July 4, 1905 |
| 1,087,094 | Berrigan | Feb. 10, 1914 |
| 1,297,372 | Loventhal | Mar. 18, 1919 |
| 1,420,139 | Peck | June 26, 1922 |
| 1,442,306 | Stonebraker | Jan. 16, 1923 |
| 1,638,977 | Avery | Aug. 16, 1927 |
| 1,683,262 | Richter | Sept. 4, 1928 |
| 1,800,965 | Spalding | Apr. 14, 1931 |
| 1,838,475 | Buswell | Dec. 29, 1931 |
| 2,184,115 | Coke | Dec. 19, 1939 |
| 2,190,136 | Oberg | Feb. 13, 1940 |
| 2,209,694 | Harford | July 30, 1940 |
| 2,236,895 | Court | Apr. 1, 1941 |
| 2,281,609 | Walter | May 5, 1942 |
| 2,368,919 | Fritzberg | Feb. 6, 1945 |
| 2,381,369 | Sconce | Aug. 7, 1945 |
| 2,410,633 | Counselman | Nov. 5, 1946 |
| 2,446,655 | Lawrason | Aug. 10, 1948 |